(12) United States Patent
Ueda et al.

(10) Patent No.: US 7,874,747 B2
(45) Date of Patent: Jan. 25, 2011

(54) INTERMEDIATE ADAPTER, CAMERA BODY AND IMAGING SYSTEM

(75) Inventors: Hiroshi Ueda, Osaka (JP); Koji Shibuno, Osaka (JP); Hidekazu Nakajima, Osaka (JP); Michihiko Ootsuka, Osaka (JP)

(73) Assignee: Panasonic Corporation, Osaka (JP)

( * ) Notice: Subject to any disclaimer, the term of this patent is extended or adjusted under 35 U.S.C. 154(b) by 95 days.

(21) Appl. No.: 12/430,590

(22) Filed: Apr. 27, 2009

(65) Prior Publication Data

US 2009/0269049 A1    Oct. 29, 2009

(30) Foreign Application Priority Data

Apr. 28, 2008   (JP) .............................. 2008-116831

(51) Int. Cl.
    *G03B 17/56* (2006.01)
(52) U.S. Cl. ........................................ 396/530; 396/71
(58) Field of Classification Search .................. 396/71, 396/530, 532, 544
    See application file for complete search history.

(56) References Cited

U.S. PATENT DOCUMENTS

| | | | |
|---|---|---|---|
| 4,728,980 A | | 3/1988 | Nakamura et al. |
| 5,060,005 A | * | 10/1991 | Itoh et al. ................... 396/303 |
| 5,371,566 A | * | 12/1994 | Asakura ...................... 396/71 |
| 5,548,369 A | * | 8/1996 | Iijima ........................... 396/71 |
| 6,352,378 B1 | * | 3/2002 | Izukawa ...................... 396/529 |
| 6,717,618 B1 | * | 4/2004 | Yoshikawa ................... 348/360 |
| 7,085,485 B2 | * | 8/2006 | Sugita et al. ................... 396/71 |
| 2006/0165401 A1 | * | 7/2006 | Doi et al. ....................... 396/71 |

FOREIGN PATENT DOCUMENTS

| JP | 62-032412 A | 2/1987 |
|---|---|---|
| JP | 63-038926 A | 2/1988 |
| JP | 7-234432 A | 9/1995 |
| JP | 2006-133621 A | 5/2006 |
| JP | 2007-079362 A | 3/2007 |

* cited by examiner

*Primary Examiner*—W. B. Perkey
*Assistant Examiner*—Leon W Rhodes
(74) *Attorney, Agent, or Firm*—Panasonic Patent Center; Dhiren Odedra; Kerry Culpepper

(57) ABSTRACT

An intermediate adapter includes a first terminal operable to be electrically connected to a lens detecting terminal provided on the camera body when the intermediate adapter is attached to the camera body, a second terminal operable to be electrically connected to a terminal provided on the interchangeable lens for providing a ground potential when the interchangeable lens is attached to the intermediate adapter, and a first switch interposed between the first terminal and the second terminal. The first switch is operable to electrically connect the first terminal and the second terminal when the first switch is on, and disconnect the electrical connection between the first terminal and the second terminal when the first switch is off. While the intermediate adapter is being attached to the interchangeable lens, the first switch is off to disconnect the electrical connection between the first terminal and the second terminal.

9 Claims, 8 Drawing Sheets

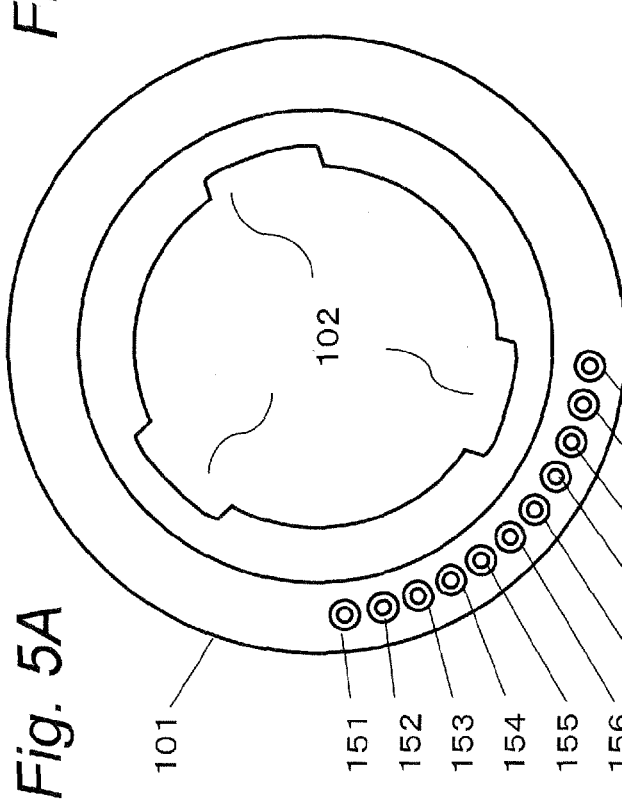
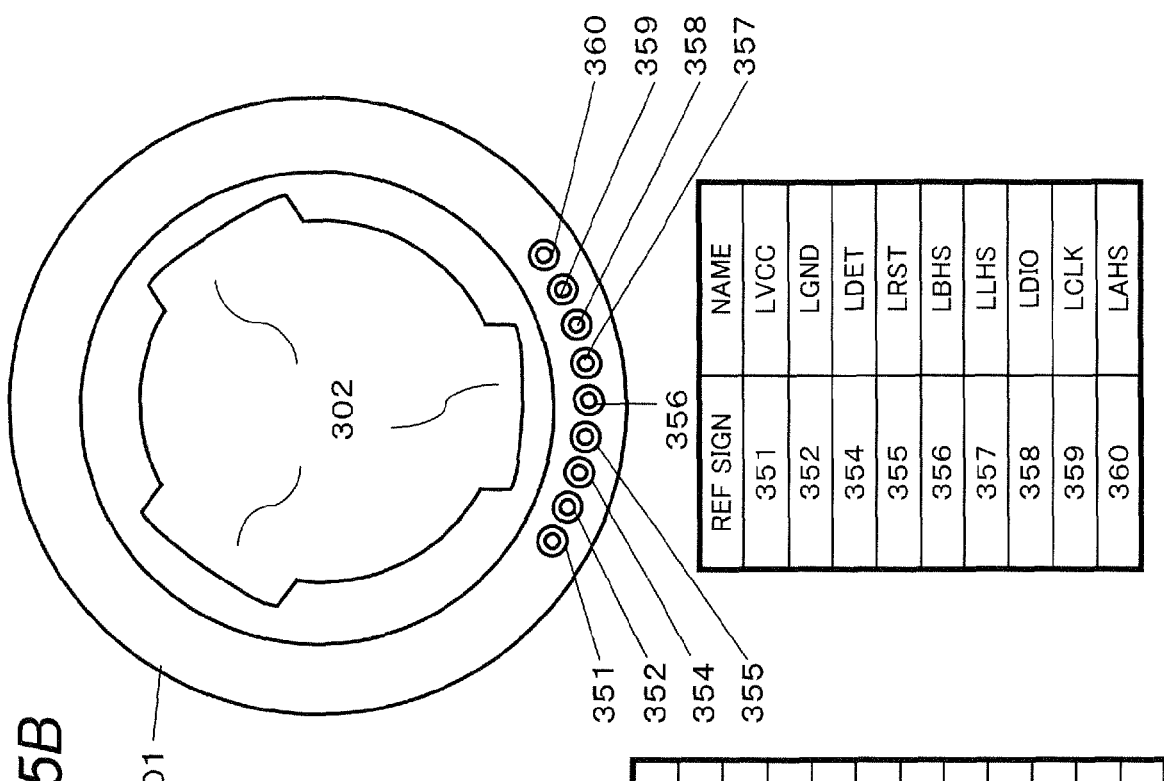
Fig. 5A
| REF SIGN | NAME |
|---|---|
| 151 | BVCC |
| 152 | BGND |
| 153 | BGND |
| 154 | BDET |
| 155 | BRST |
| 156 | BBHS |
| 157 | BLHS |
| 158 | BDIO |
| 159 | BCLK |
| 160 | BAHS |
| 161 | BAUX |
Fig. 5B
| REF SIGN | NAME |
|---|---|
| 351 | LVCC |
| 352 | LGND |
| 354 | LDET |
| 355 | LRST |
| 356 | LBHS |
| 357 | LLHS |
| 358 | LDIO |
| 359 | LCLK |
| 360 | LAHS |

CAMERA BODY
(ADAPTER)

CAMERA BODY      ADAPTER
(ADAPTER)        (LENS)

CAMERA BODY      ADAPTER
(ADAPTER)        (LENS)

INTERMEDIATE ADAPTER, CAMERA BODY AND IMAGING SYSTEM

BACKGROUND

1. Technical Field

The technical fields relates to an intermediate adapter used for using an interchangeable lens which is not directly fitted to a camera body, that is to be interposed between the camera body and the interchangeable lens.

2. Related Art

In order to use an interchangeable lens that is not directly fitted to a camera body, an intermediate adapter that is interposed between the camera body and the interchangeable lens has been known. The intermediate adapter is used in such a way that the intermediate adapter is first attached to the camera body and then the interchangeable lens is attached to the intermediate adapter. The intermediate adapter is provided with terminals corresponding to the respective signal terminals, power-supply terminals and the like of the camera body and the interchangeable lens. Communication between the camera body and the interchangeable lens are conducted through the terminals of the intermediate adapter.

JP-A-07-234432 discloses structure of an intermediate adapter including a CPU as one aspect of the intermediate adapter. In the camera system disclosed in JP-A-07-234432, although the intermediate adapter has the CPU, the communication between the camera body and the interchangeable lens is conducted not through the CPU. Therefore, since no communication delay is raised and the structure of the intermediate adapter becomes simpler. The CPU in the intermediate adapter communicates with a CPU in the camera body by using a three-wire serial method so that correction data are transmitted to the CPU of the camera body.

After the interchangeable lens is attached to the camera body through the intermediate adapter interposed therebetween, power-supply voltage is supplied from the camera body to the interchangeable lens through the intermediate adapter. However, when the power-supply voltage is supplied from the camera body to the interchangeable lens while attaching the interchangeable lens to the camera body, the power-supply voltage is erroneously supplied to terminals other than the power-supply terminals, causing a failure. Therefore, the camera body needs to supply the power-supply voltage to the interchangeable lens after recognizing the attachment of the interchangeable lens to the adapter. Consequently, it is important to detect accurately attachment of the interchangeable lens to the adapter.

SUMMARY

To solve the above-mentioned problem, an intermediate adapter is provided, which is capable of accurately detecting an attaching state of the interchangeable lens to an intermediate adapter, when attaching the interchangeable lens to the camera body through the intermediate adapter.

In a first aspect, intermediate adapter to be interposed between a camera body and an interchangeable lens is provided. The intermediate adapter includes a first terminal operable to be electrically connected to a lens detecting terminal provided on the camera body when the intermediate adapter is attached to the camera body, a second terminal operable to be electrically connected to a terminal provided on the interchangeable lens for providing a ground potential when the interchangeable lens is attached to the intermediate adapter, and a first switch interposed between the first terminal and the second terminal. The first switch is operable to electrically connect the first terminal and the second terminal when the first switch is on, and disconnect the electrical connection between the first terminal and the second terminal when the first switch is off. While the intermediate adapter is being attached to the interchangeable lens, the first switch is off to disconnect the electrical connection between the first terminal and the second terminal.

In accordance with the above-mentioned structure, while attaching the intermediate adapter to the interchangeable lens, an electrical connection between a first terminal that is connected to a lens detecting terminal provided on the camera body and a second terminal is cut off, thus fixing the potential of the lens detecting terminal provided on the camera body. Therefore, while attaching the intermediate adapter to the interchangeable lens, it is possible to prevent an erroneous signal from being detected by the lens detecting terminal, and consequently attachment of the interchangeable lens can be detected accurately.

In a second aspect, a camera body to which a first interchangeable lens can be attached directly and a second interchangeable lens can be attached through an intermediate adapter is provided. The first interchangeable lens has a plurality of terminals disposed in a first arrangement. The second interchangeable lens has a plurality of terminals disposed in a second arrangement. The camera body includes a plurality of terminals disposed to be electrically connected to the plurality of terminals of the first interchangeable lens, respectively. Two adjacent terminals of the terminals of the camera body are operable to transmit a same electric signal. The intermediate adapter is operable to electrically connect the two adjacent terminals of the camera body to one of the terminals of the second interchangeable lens when the intermediate adapter is attached between the camera body and the second interchangeable lens.

To achieve this, the intermediate adapter includes a wiring for connecting the two adjacent terminals of the camera body to one of the second terminals of the second interchangeable lens when the intermediate adapter is attached between the camera body and the second interchangeable lens.

In a third aspect, an imaging system including a camera body, an intermediate adapter, and an interchangeable lens that is attached to the camera body through the intermediate adapter is provided. The Intermediate adapter includes a first ground terminal, a second ground terminal electrically connected to the first ground terminal, a first lens detecting terminal, and a second lens detecting terminal operable to be electrically connected to the first lens detecting terminal through a switch provided in the intermediate adapter. The camera body includes a switch for detecting attachment of the intermediate adapter to the camera body, a grounding terminal, and a lens detecting terminal, attachment of the interchangeable lens being determined based on a potential of the lens detecting terminal of the camera body. The interchangeable lens includes a grounding terminal electrically connected to a ground potential, and a lens detecting terminal electrically connected to a ground potential.

When the intermediate adapter is attached to the camera body, the grounding terminal of the camera body is electrically connected to the first grounding terminal of the intermediate adapter and the lens detecting terminal of the camera body is electrically connected to the first lens detecting terminal of the intermediate adapter. When the interchangeable lens is attached to the intermediate adapter, the second ground terminal of the intermediate adapter is electrically connected to the grounding terminal of the interchangeable lens and the second lens detecting terminal of the intermediate adapter is electrically connected to the lens detecting terminal of the interchangeable lens. While the intermediate adapter is being attached to the interchangeable lens, the switch provided in the intermediate adapter disconnects an electrical connection between the first lens detecting terminal and the second lens detecting terminal of the intermediate adapter.

In accordance with the aforementioned aspects, upon attaching an interchangeable lens to an intermediate adapter, attachment of the interchangeable lens to the intermediate adapter can be detected accurately.

BRIEF DESCRIPTION OF DRAWINGS

FIGS. 5A and 5B are views for comparing the mount of the camera body with the mount of the intermediate adapter.

DETAIL DESCRIPTION OF PREFERRED EMBODIMENTS

Embodiment 1

1. Structure

Figure 1:
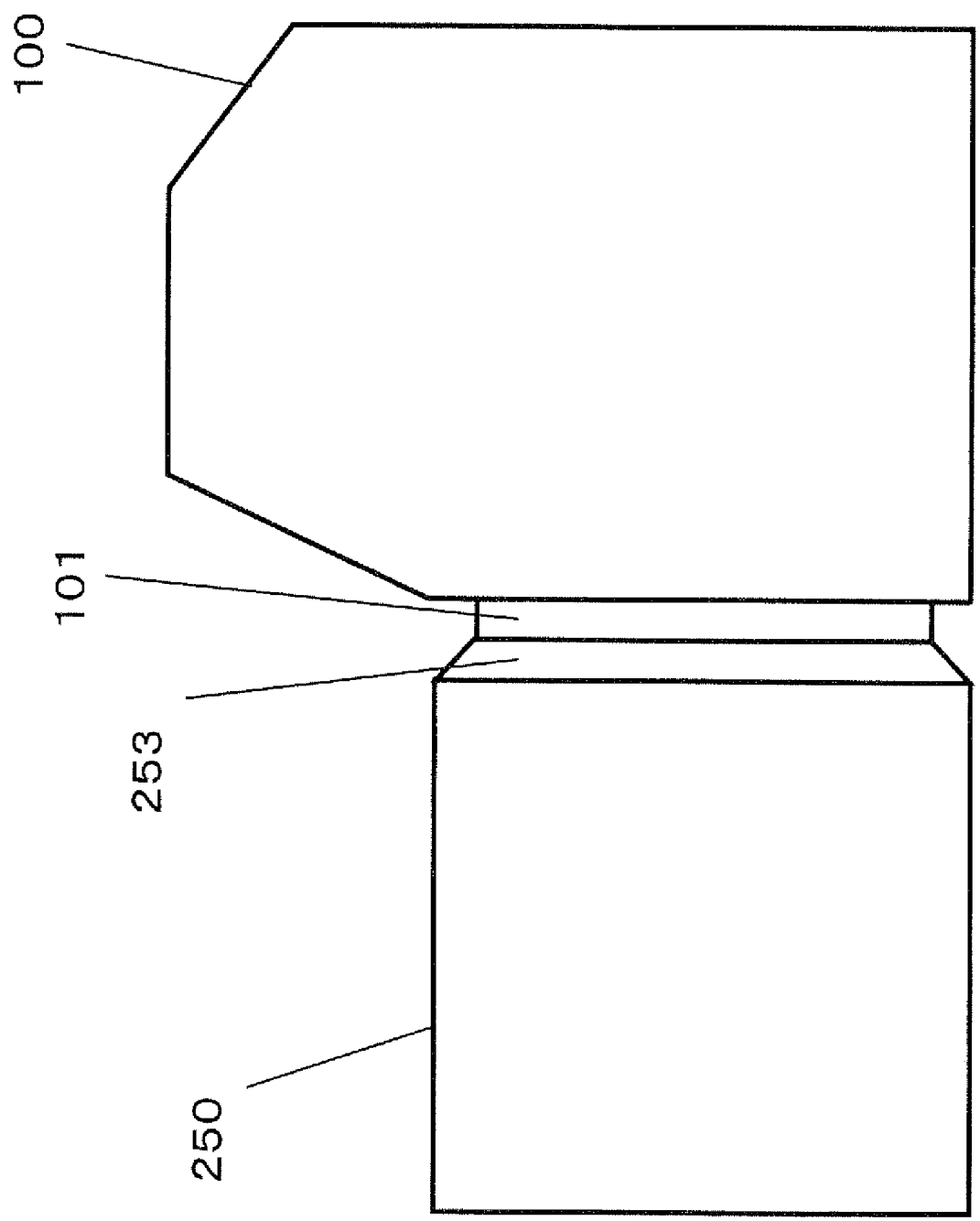
FIG. 1 is a view showing a structure of an imaging system with no intermediate adapter inserted.

FIG. 1 is a schematic view showing an imaging system with an interchangeable lens 250 directly attached to a camera body 100. A mount 101 used for attaching the interchangeable lens 250 in a bayonet system is provided on the camera body 100. Here, the interchangeable lens 250 is a lens directly mountable to the camera body 100.

Figure 2:
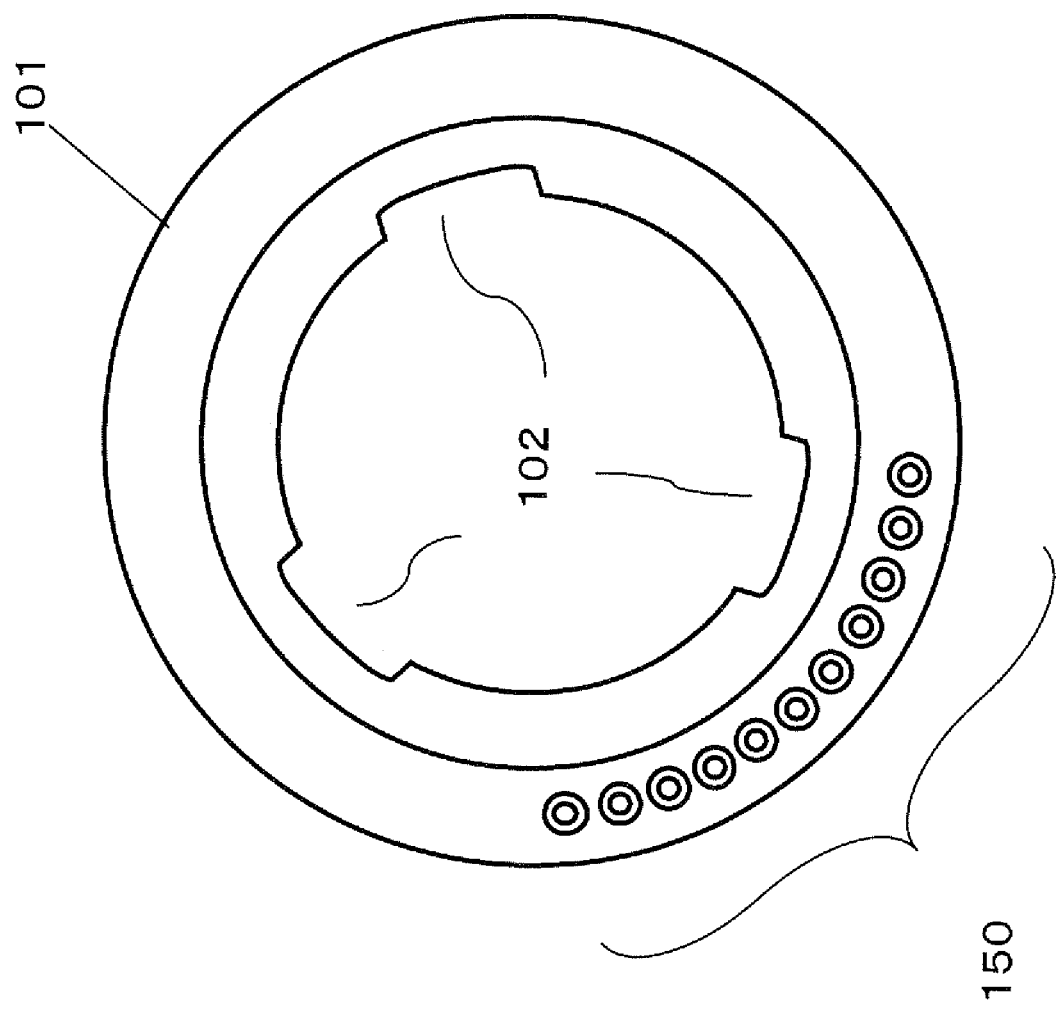
FIG. 2 is a front view showing a mount of the camera body.

FIG. 2 is a view showing the mount 101 of the camera body 100 viewed from the front side. The interchangeable lens 250 directly mountable to the camera body 100 can be directly attached to the camera body 100 by inserting a claw (not shown) formed on a joining portion 253 (see FIG. 1) of the interchangeable lens 250 into a cut-out portion 102 of the mount 101 of the camera body 100 and rotating the lens 250 clockwise. Terminals 150 for communicating with the interchangeable lens 250 are provided on the mount 101 of the camera body 100.

Here, when the shape of the joining portion (203) of the interchangeable lens does not match the mount 101 of the camera body 10, the interchangeable lens, as it is, is not attachable to the camera body 100. Moreover, the camera body 100 controls the focusing lens, diaphragm and the like (not shown) of the interchangeable lens by communicating with the interchangeable lens. Consequently, even when the shape of the joining portion (203) of the interchangeable lens matches the mount 101 of the camera body 100, if the specification of the terminals of the interchangeable lens for communicating with the camera body 100 does not match the specification of terminals 150 of the camera body 100, the camera body 100 fails to control the focusing lens, the diaphragm and the like of the interchangeable lens, even though the interchangeable lens can be mechanically attached thereto. The present embodiment provides an intermediate adapter that can eliminate such a mechanical and electrical mismatch between the camera body 100 and the interchangeable lens.

Figure 3:
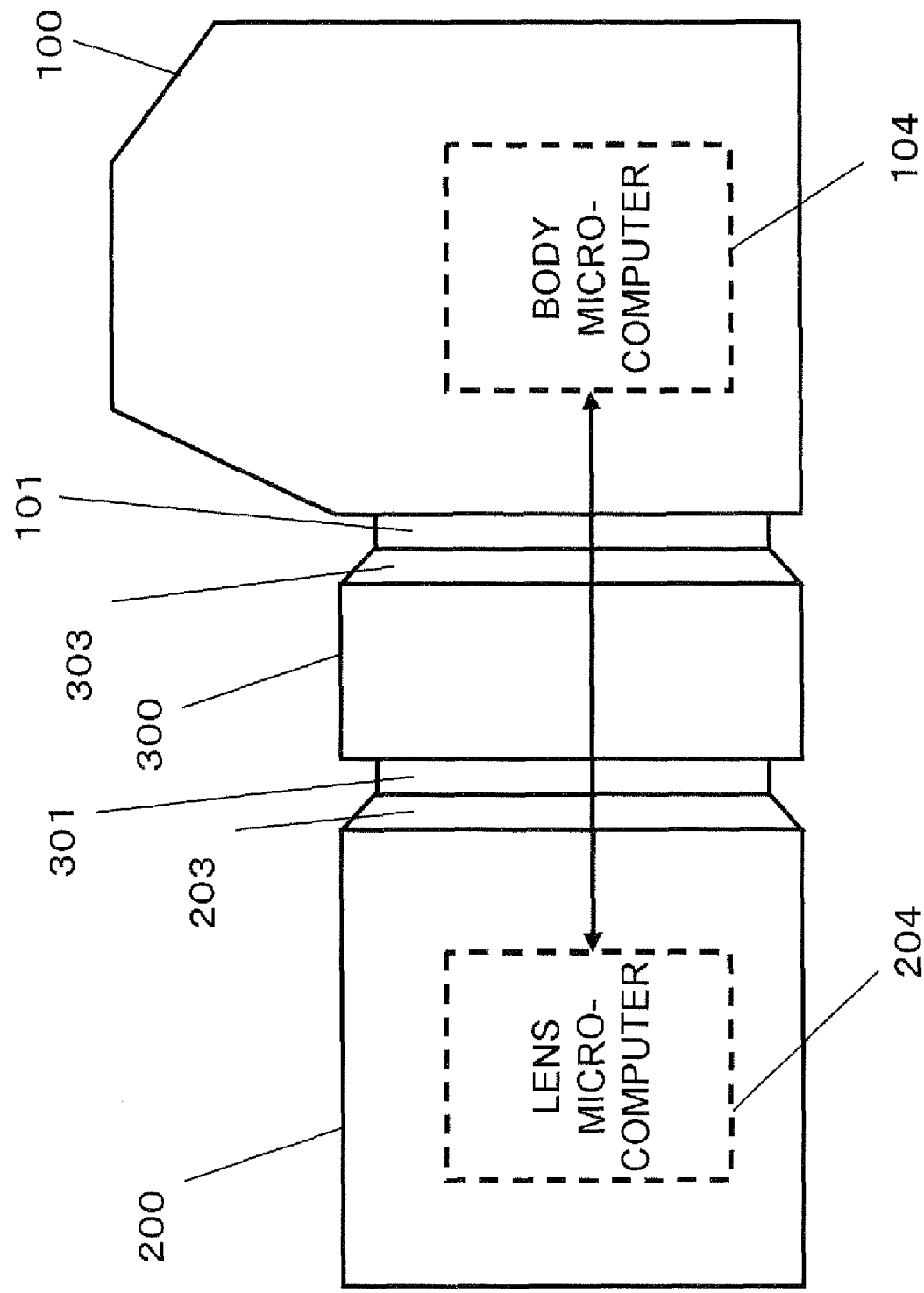
FIG. 3 is a view showing a structure of an imaging system with an intermediate adapter of one embodiment inserted.

FIG. 3 shows an imaging system with a interchangeable lens 200 which is not directly mountable to a camera body 100 being attached to the camera body 100 through an intermediate adapter 300 of the present embodiment.

The camera body 100 includes a body microcomputer 104 for controlling operations of the entire imaging system. The interchangeable lens 200 includes a lens microcomputer 204 for controlling operations of the interchangeable lens 200. The body microcomputer 104 and the lens microcomputer 204 communicate with each other.

A joining portion 303 which is similar to the joining portion 253 of the interchangeable lens 250 is formed on the side of the intermediate adapter 300 that is to be attached to the camera body 100. The shape of the joining portion 303 of the intermediate adapter 300 is formed to be a shape matched with the mount 101 of the camera body 100. Therefore, the intermediate adapter 300 can be attached to the camera body 100 by inserting a claw (not shown) formed on the joining portion 303 of the intermediate adapter 300 into the cut-out portion 102 of the mount 101 of the camera body 100 and rotating the lens 100 clockwise.

On the side of the intermediate adapter 300 at which the interchangeable lens 200 is attached, a mount 301 is formed, the mount 301 having a shape which matches the joining portion 203 of the interchangeable lens 200 but is different from the shape of the mount 101 of the camera body 100. With this arrangement, the interchangeable lens 200 which is not directly mountable to the mount 101 of the camera body 100 can be attached to the intermediate adapter 300.

Figure 4:
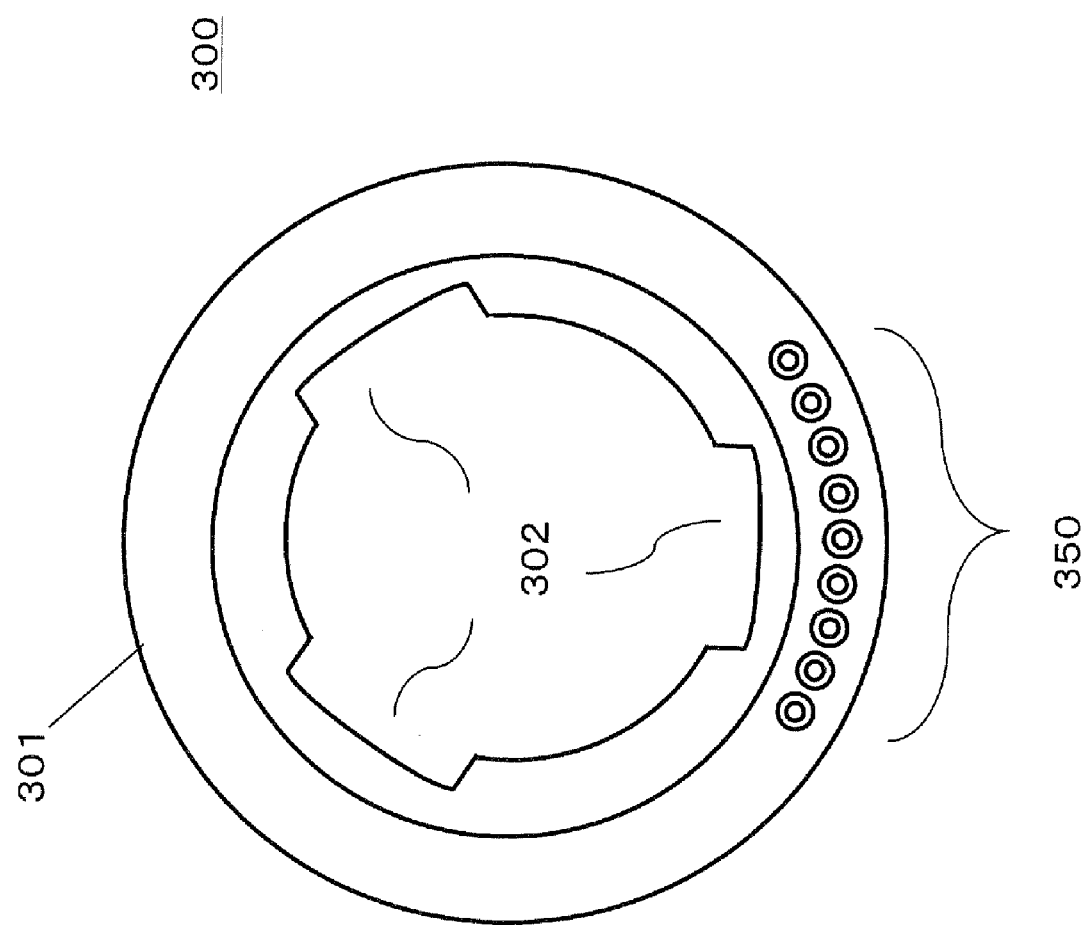
FIG. 4 is a front view showing a mount on the intermediate adapter side.

FIG. 4 is a view that shows the mount 301 of the intermediate adapter 300 viewed from the front side (the camera body attaching side). The shape of the joining portion 203 of the interchangeable lens 200 matches the mount 301 of the intermediate adapter 300. Therefore, the interchangeable lens 200 can be attached to the intermediate adapter 300 by inserting a claw (not shown) formed on the joining portion 203 of the interchangeable lens 200 into a cut-out portion 302 of the mount 301 of the intermediate adapter 300 and rotating the lens 200 clockwise. Terminals 350 for communicating with the interchangeable lens 200 are provided on the mount 301 of the intermediate adapter 300.

As described above, the intermediate adapter 300 eliminates a mechanical mismatch between the mount 101 of the camera body 100 and the joining portion 203 of the interchangeable lens 200. The intermediate adapter 300 makes a conversion for matching the specification of the terminals of the interchangeable lens 200 with the specification of the terminals 150 of the camera body 100, eliminating an electrical mismatch or the like between the camera body 100 and the interchangeable lens 200. Therefore, the body microcomputer 104 built in the camera body 100 communicates with the lens microcomputer 204 built in the interchangeable lens 200 to control the focusing lens, the diaphragm and the like of the interchangeable lens 200.

2. Wiring

FIGS. 5A and 5B are views for comparing the mount 101 of the camera body 100 with the mount 301 of the intermediate adapter 300. FIG. 5A is a view showing the shape of the mount 101 of the camera body 100 and names of respective terminals 151 to 161. FIG. 5B is a view showing the shape of the mount 301 of the intermediate adapter 300 and names of respective terminals 351 to 359. The cut-out portion 102 of the mount 101 of the camera body 100 and the cut-out portion 302 of the mount 301 of the intermediate adapter 300 are different from each other in their sizes and positions. Moreover, the terminals 151 to 161 of the mount 101 of the camera body 100 and the terminals 351 to 359 of the mount 301 of the intermediate adapter 300 are different from each other in their numbers and positions. The intermediate adapter 300 eliminates the above-mentioned mechanical and electrical mismatches between the mount 101 of the camera body 100 and the joining portion 203 of the interchangeable lens 200.

The following description will discuss the terminals 151 to 161 of the mount 101 of the camera body 100 and the terminals 351 to 359 of the mount 301 of the intermediate adapter 300 shown in FIGS. 5A and 5B. BVCC 151 and LVCC 351 are power supply terminals by which power is supplied to the interchangeable lens 200 from the camera body 100 through the intermediate adapter 300. Moreover, BGND 152, BGND 153 and LGND 352 are grounding terminals. Two grounding terminals BGND 152 and BGND 153 are provided to the camera body 100 and only one grounding terminal is provided to the interchangeable lens 200, and thus only one grounding terminal, that is, LGND 352, is provided to the intermediate adapter 300. The BGND 152 and BGND 153 are combined into one terminal in the intermediate adapter 300 and then connected to LGND 352.

BDET 154 and LDET 354 are detection terminals for detecting attachment of the interchangeable lens 200. BRST 155 and LRST 355 are reset terminals for resetting the interchangeable lens 200 by the camera body 100. BBHS 156, BLHS 157, LBHS 356 and LLHS 357 are hand-shake terminals for communication between the camera body 100 and the interchangeable lens 200. BDIO 158, BCLK 159, LDIO 358 and LCLK 359 are terminals for communication between the camera body 100 and the interchangeable lens 200 in a two-wire serial system. BDIO 158 and LDIO 358 are data terminals, and BCLK 159 and LCLK 359 are clock terminals. BAHS 160 and LAHS 360 are hand-shake terminals for communication between the camera body 100 and accessories. BAUX 161 is an auxiliary terminal, which is open in the intermediate adapter 300 since it is not used in the interchangeable lens 200. Therefore, there is no terminal corresponding to BAUX 161 in the mount 301 of the intermediate adapter 300.

Figure 6:
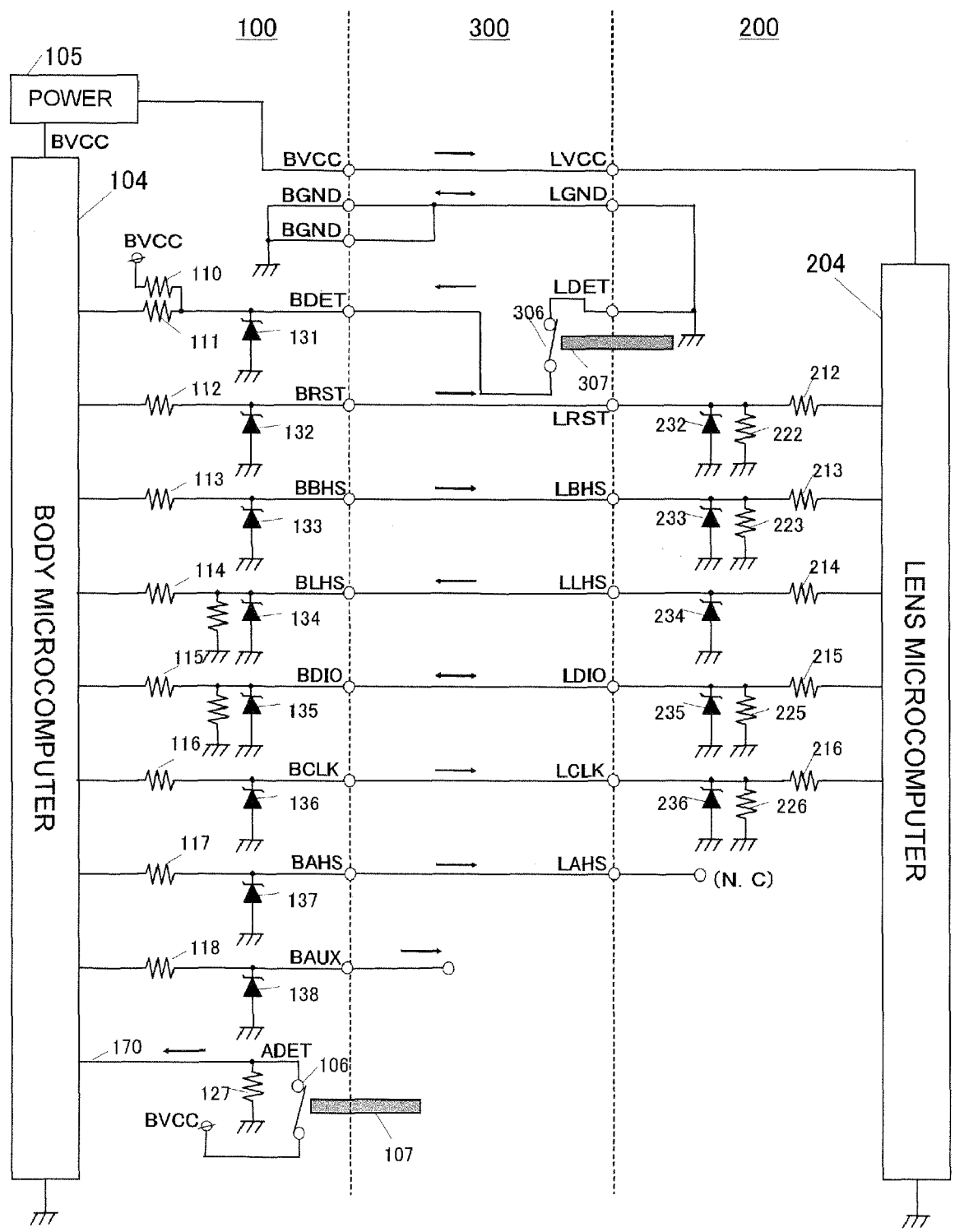
FIG. 6 is a wiring diagram of an imaging system with the intermediate adapter of embodiment 1.

FIG. 6 is a wiring diagram of an imaging system with an interchangeable lens 200 which is not directly mountable to the camera body 100 being attached to the camera body 100 through the intermediate adapter 300 of the present embodiment.

As shown in FIG. 6, the intermediate adapter 300 includes wires connecting the respective terminals of the camera body 100 to the corresponding terminals of the interchangeable lens 200.

The camera body 100 is provided with a power supply circuit 105. The output of the power supply circuit 105 is supplied to the body microcomputer 104 and the other blocks (not shown) in the camera body 100, and is also supplied to the lens microcomputer 204 and the other blocks (not shown) in the interchangeable lens 200 through BVCC 151 and LVCC 351. BGND 152 and BGND 153 are grounded in the camera body 100, are also combined into one line by the wiring in the intermediate adapter 300, and then connected to LGND 352 to also be grounded in the interchangeable lens 200.

Although the camera body 100 has the two grounding terminals BGND 152 and BGND 153, the interchangeable lens 200 has only one grounding terminal corresponding to those terminals, that is, LGND 352. In this case, the grounding terminals BGND 152 and BGND 153 of the camera body 100 are preferably provided adjacently. For example, when BGND 153 is provided adjacent to BAUX 161, in order to combine BGND 152 and BGND 153 with each other to form one line in the intermediate adapter 300, it needs to make a wire from BDET 154 to BAHS 160 intersect with a wire of BGND 153. To do so, at least two layers of flexible substrates are required, causing a high cost in the intermediate adapter 300. In contrast, when BGND 152 and BGND 153 are provided adjacently, the wiring of the intermediate adapter 300 can be achieved by using a single layer of the flexible substrate. Here, in place of providing the two grounding terminals, BGND 152 and BGND 153, adjacently, BGND 153 may be opened in the intermediate adapter 300. In this case, the wiring of the intermediate adapter 300 can be achieved by using a single layer of the flexible substrate. However one end of the wiring is kept open, and this is not a desirable state from electrical viewpoint.

BDET 154 is connected to BVCC 151 through a resistor 110. Therefore, in a state where no intermediate adapter 300 is attached to the camera body 100, the body microcomputer 104 detects an "H" (High: a high potential in the signal line) of BDET 154. BDET 154 is connected to LDET 354 through a switch 306 in the intermediate adapter 300. A pin 307 is designed in a manner so as to move by contact with a portion of the main body of the interchangeable lens 200 to open/close (ON/OFF) the switch 306. More specifically, the pin 307 is configured so as to open the switch 306 when no interchangeable lens 200 is attached to the intermediate adapter 300 and to close the switch 306 when the interchangeable lens 200 is attached to the intermediate adapter 300. Therefore, in a state where the intermediate adapter 300 is attached to the camera body 100 but no interchangeable lens 200 is attached to the intermediate adapter 300, the switch 306 is opened so that the body microcomputer 104 detects an "H" of BDET 154. In contrast, in a state where the intermediate adapter 300 is attached to the camera body and the interchangeable lens 200 is attached to the intermediate adapter 300, the switch 306 is closed to ground LDET 354 in the interchangeable lens 200. Thus the body microcomputer 104 detects an "L" (Low: a low potential in the signal line) of BDET 154.

Each of BRST 155, BBHS 156, BLHS 157, BDIO 158, BCLK 159 and BAHS 160 is connected to the corresponding terminal in the intermediate adapter 300, that is, each of LRST 355, LBHS 356, LLHS 357, LDIO 358, LCLK 359 and LAHS 360, respectively. LAHS 360 is not used in the interchangeable lens 200, and thus it is opened in the interchangeable lens 200. Moreover, BAUX 161 is not used in the interchangeable lens 200, and thus it is opened in the intermediate adapter 300.

The camera body 100 is provided with a switch 106 one end of which is grounded through a resistor 127 and the other end of which is connected to BVCC 151. The opening/closing operation (ON/OFF) of the switch 106 is carried out by a pin 107. The pin 107 is designed to move by contact with a portion of the main body of the intermediate adapter 300 so as to carry out the opening/closing operations (ON/OFF) of the switch 106. More specifically, the pin 107 is designed so as to open the switch 106 when no intermediate adapter 300 is attached to the camera body 100, and to close the switch 106 when the intermediate adapter 300 is attached to the camera body 100. Therefore, in a state where no intermediate adapter 300 is attached to the camera body 100, the switch 106 is opened, causing the body microcomputer 104 to detect an "L" of ADET 170. In contrast, in a state where the intermediate adapter 300 is attached to the camera body 100, the switch 106 is closed, causing the body microcomputer 104 to detect a "High" of ADET 170. In this manner, ADET 170 is used for detecting attachment of the intermediate adapter 300 to the camera body 100. The switch 106 and the pin 107 are one example of an attachment detection unit for detecting attachment of the adapter to the camera body 100.

Here, in order to prevent the body microcomputer 104 and the lens microcomputer 204 from being broken due to external noise, such as static electricity, all the terminals are grounded through zener diodes 131 to 138 and 232 to 236. Resistors 110 to 118 and resistors 212 to 216 are damping resistors for reducing an abrupt change in signals to suppress noise. Resistors 124 and 125 as well as resistors 222, 223, 225 and 226 are protective resistors that protect input terminals or input/output terminals. In FIG. 6, the directions of the respective signals are indicated by arrows.

In the above explanation, each of the detection of attachment of the intermediate adapter 300 to the camera body 100 and the detection of attachment of the interchangeable lens 200 to the intermediate adapter 300 is supposed to be carried out by using a pin and a switch. However, the embodiment is not limited by this arrangement. Instead of the mechanical detection method, an optical detection method by using a photo-interrupter or the like and a magnetic detection method by using a Hail element may be adopted. These detection methods require fewer movable units in comparison with the mechanical detection method, thus improving the reliability and durability.

3. Operations

By using the intermediate adapter 300 constructed and wired as described above, the body microcomputer 104 can detect attachment of the intermediate adapter 300 and the interchangeable lens 200 step by step. Table 1 shows detection status of ADET 170 and BDET 154 by the body microcomputer 104 in association with attachment states of the intermediate adopter 300 and the interchangeable lens 200.

TABLE 1

| | ADET | BDET |
|---|---|---|
| no intermediate adapter attached | L | H |
| intermediate adapter attached (with no interchangeable lens attached) | H | H |
| intermediate adapter attached and interchangeable lens attached | H | L |

When no intermediate adapter 300 is attached to the camera body 100, the body microcomputer 104 detects an "L" of ADET 170. Moreover, in the case where no intermediate adapter 300 is attached to the camera body 100, no interchangeable lens 200 is of course attached thereto, and thus the body microcomputer 104 detects an "H" of BDET 154. Consequently, when ADET 170 is in "L" and BDET 154 is in "H", it is recognized that no intermediate adapter 300 is attached to the camera body 100.

When the intermediate adapter 300 is attached to the camera body but no interchangeable lens 200 is attached to the intermediate adapter 300, the body microcomputer 104 detects "H" of ADET 170 and "H" of BDET 154. Therefore, when ADET 170 is in "H" and BDET 154 is in "H", it is recognized that the intermediate adapter 300 is attached to the camera body 100 but no interchangeable lens 200 is attached the intermediate adapter 300.

When the intermediate adapter 300 is attached to the camera body 100 and the interchangeable lens 200 attached to the intermediate adapter 300, the body microcomputer 104 detects "H" of ADET 170 and "L" of BDET 154. Therefore, when ADET 170 is in "H" and BDET 154 is in "L", it is recognized that the intermediate adapter 300 is attached to the camera body 100 and the interchangeable lens 200 is also attached to the intermediate adapter 300.

Embodiment 2

Figure 7:
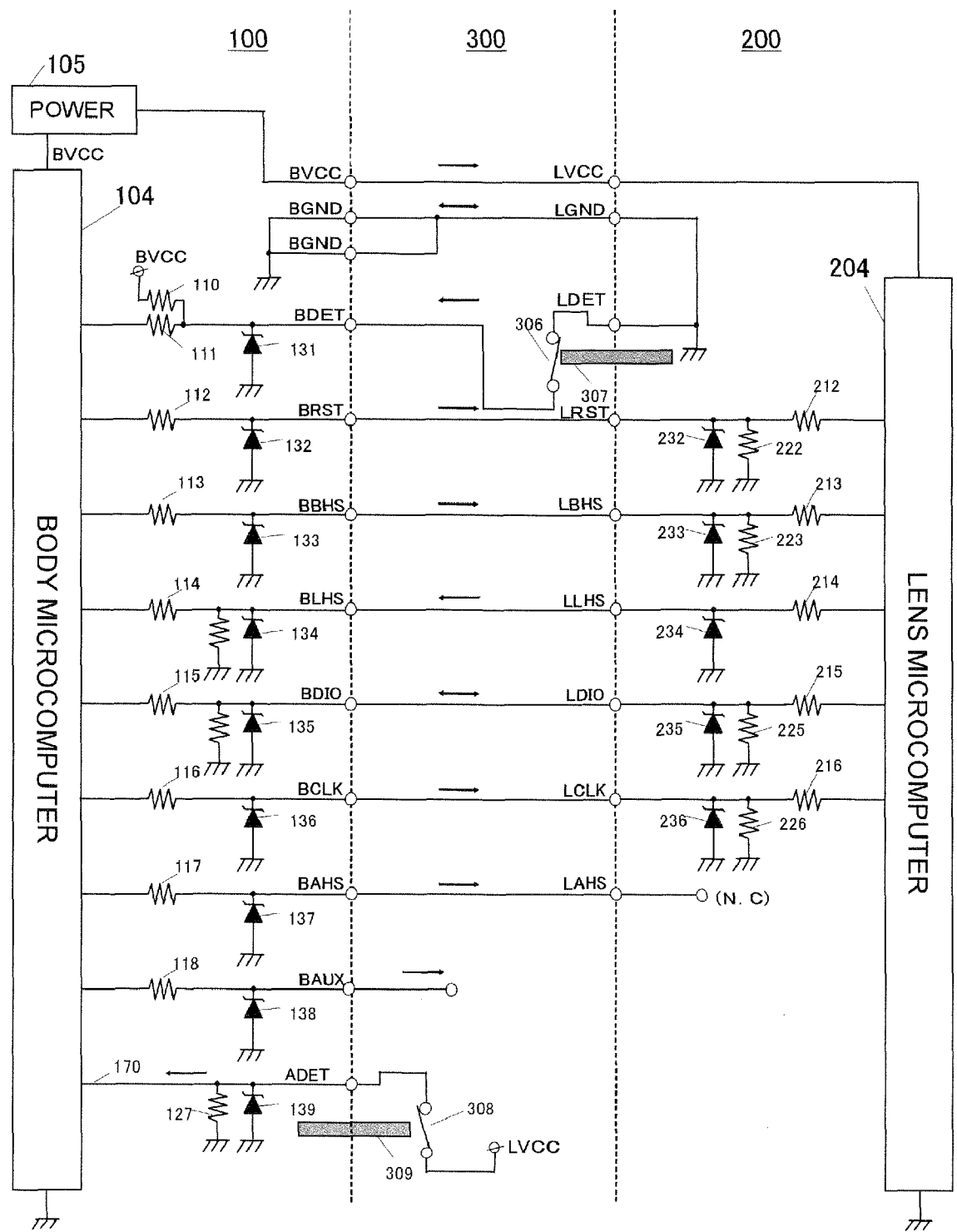
FIG. 7 is a wiring diagram of an imaging system with an intermediate adapter of embodiment 2.

FIG. 7 shows another example of structure (wiring diagram) of an imaging system. The intermediate adapter 300 and the camera body 100 shown in FIG. 7 differ from those in the structure shown in FIG. 6 of embodiment 1 in structure relating to the switch 106 and the pin 107 for detecting attachment of the adapter. More specifically, in the structure of FIG. 7, the switch 106 and the pin 107 for detecting attachment of the adapter are removed from the camera body 100 in the structure shown in FIG. 6, and in place of these, a switch 308 and a pin 309 for detecting attachment of the adapter are installed in the intermediate adapter 300. Here, a detection unit related to BDET 154 includes a switch 306 and a pin 307 in the same manner as in the structure shown in FIG. 6. Moreover, a terminal (not shown) on the intermediate adapter 300 side for BDET 154 and a terminal (not shown) on the intermediate adapter 300 side for ADET 170 form one example of an informing unit. The other structures are the same as those of embodiment 1 (structures shown in FIG. 6), and the description thereof will be omitted.

In the structure shown in FIG. 7, ADET 170 is a terminal to be connected to the intermediate adapter 300, and is exposed to the outside of the camera body 100. Therefore, in order to prevent damages to the body microcomputer 104 due to external noise, such as static electricity, this is grounded through a zener diode 139.

The switch 308 provided in the intermediate adapter 300 has its one end connected to LVCC 351 and the other end connected to ADET 170. The pin 309 is configured so as to open the switch 308 when no intermediate adapter 300 is attached to the camera body 100, and to close the switch 308 when the intermediate adapter 300 is attached to the camera body 100. Therefore, when no intermediate adapter 300 is attached to the camera body 100, the switch 308 is opened and thus the body microcomputer 104 detects "L" of ADET 170. In contrast, when the intermediate adapter 300 is attached to the camera body 100, the switch 308 is closed and thus the body microcomputer 104 detects "H" of ADET 170.

With this arrangement, the camera body 100 is no longer required to have the switch 106 and the pin 107, it becomes possible to cut costs of the camera body 100. Here, the detection status of ADET 170 and BDET 154 by the body microcomputer 104 in association with the attachment status of the intermediate adopter 300 and the interchangeable lens 200 are the same as those shown in Table 1, the description thereof is omitted.

Embodiment 3

Embodiments 1 and 2 have explained the structure capable of detecting the attachment or not-attachment of the adapter 300 and the interchangeable lens 200 to the camera body 100. The present embodiment will discuss a structure for preventing an erroneous detection during an operation for attaching the intermediate adapter 300 and the interchangeable lens 200.

The structure of the imaging system of the present embodiment is basically the same as that explained in embodiment 1, however, it differs from embodiment 1 in operations of the switch 106 and the switch 306. Referring to FIG. 8, the following description will discuss the operations of the switch 106 and the pin 107 of the present embodiment.

Figure 8A:
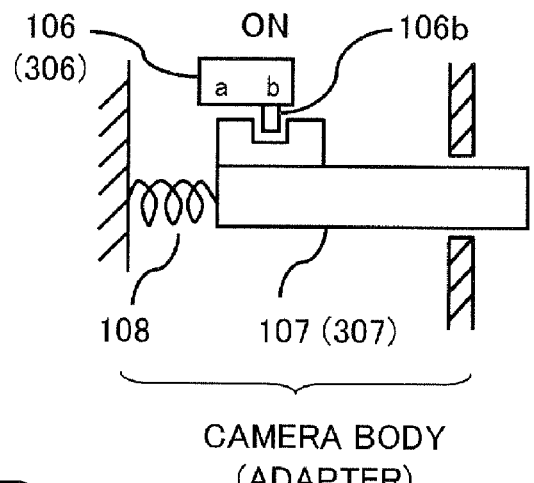
FIGS. 8A to 8C are explanatory views indicating operations relating to various attachment statuses between various kinds of switches and pins for detecting attachment status among a camera body, an intermediate adapter and an interchangeable lens, in accordance with embodiment 3.
Figure 8B:
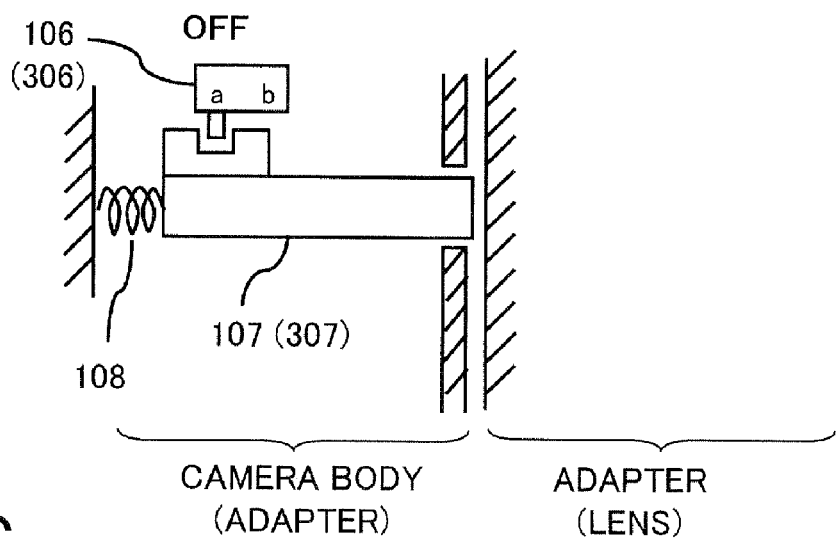
Figure 8C:
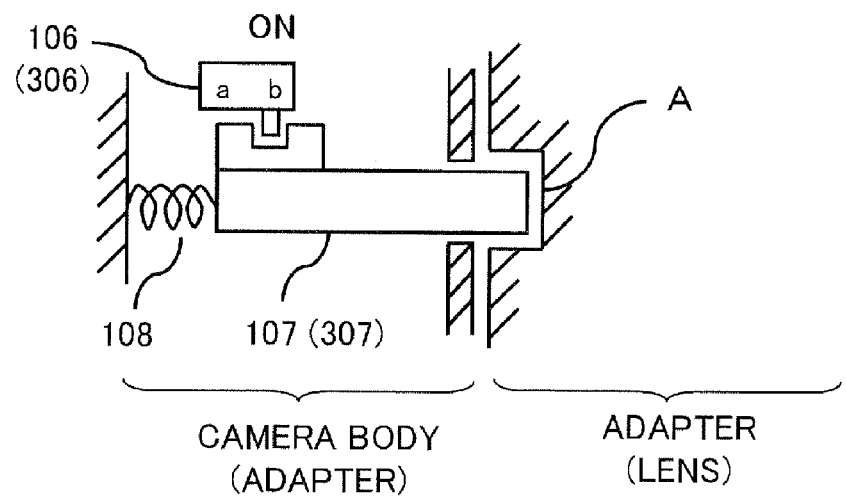

FIG. 8A is a view showing status of the switch 106 and the pin 107 when no intermediate adapter 300 is attached to the camera body 100. FIG. 8B is a view showing status of the switch 106 and the pin 107 while the intermediate adapter 300 is being attached to the camera body 100. FIG. 8C is a view showing status of the switch 106 and the pin 107 upon completion of attaching the intermediate adapter 300 to the camera body 100.

As shown in FIGS. 8A to 8C, the pin 106 is biased outward from the camera body 100 with a spring 108. The switch 106 has a protruding portion 106b which slides in association with the movement of pin 107. When the protruding portion 106b is located at a position "b", the switch 106 is turned on. When the protruding portion 106b is located at a position "a", the switch 106 is turned off. A concave section A is formed on the intermediate adapter 300 or the interchangeable lens 200. When the intermediate adapter 300 or the interchangeable lens 200 is attached correctly to the attaching position of the camera body 100, the pin 107 is fitted to the concave section A. When the pin 107 is fitted to the concave section A, the protruding portion 106b is moved to the position "b" by the pin 107, turning on the switch 106.

As described above, when the intermediate adapter 300 is not attached to the camera body 100, the switch 106 is on. When the intermediate adapter 300 is being attached to the camera body 100, the switch 106 is off. When the operation for attaching the intermediate adapter to the camera body 100 is completed, the switch 106 is on.

Moreover, in the present embodiment, the switch 306 and the pin 307 relating to BDET provided in the intermediate adapter 300 also have the same structure as that of the switch 106 and the pin 107 as shown in FIGS. 8A to 8B and operate in the same manner. That is, when the interchangeable lens 200 is not attached to the intermediate adapter 300, the switch 306 is on. During the operation for attaching the interchangeable lens 200 to the intermediate adapter 300, the switch 306 is off. When the operation for attaching the interchangeable lens 200 to the intermediate adapter 300 has been completed, the switch 306 is on.

Table 2 shows detection status of ADET 170 and BDET 154 by the body microcomputer 104 in association with attachment states of the intermediate adopter 300 and the interchangeable lens 200 in the present embodiment.

TABLE 2

|  | ADET | BDET | condition of switch 106 | condition of switch 306 |
| --- | --- | --- | --- | --- |
| intermediate adapter not-attached | H | H | FIG. 8A | — |
| during an operation for attaching intermediate adapter (with no interchangeable lens attached) | L | H | FIG. 8B | — |
| intermediate adapter attached (with no interchangeable lens attached) | H | H | FIG. 8C | FIG. 8A |
| during an operation for attaching interchangeable lens (with intermediate adapter attached) | H | H | FIG. 8C | FIG. 8B |
| intermediate adapter attached, interchangeable lens attached | H | L | FIG. 8C | FIG. 8C |

In the case where no intermediate adapter 300 is attached to the camera body 100, the switch 106 and the pin 107 are brought into the condition shown in FIG. 8A, so that the switch 106 is turned on and an "H" of ADET 170 is detected. Since BDET 154 is connected to BVCC 151 through the resistor 110, an "H" of BDET 154 is detected.

During the operation for attaching the intermediate adapter 300 to the camera body 100, the switch 106 and the pin 107 take the condition shown in FIG. 8B, so that the switch 106 is turned off. Consequently, ADET 170 is grounded through a resistor 127, and thus "L" of ADET 170 is detected. Here, since the connected status of BDET 154 has no change, "H" thereof is detected.

Upon completion of attaching the intermediate adapter 300 to the camera body 100, the switch 106 and the pin 107 take the condition shown in FIG. 8C so that the switch 106 is turned on and "H" of ADET 170 is detected. Since the connected state of BDET 154 has no change, "H" thereof is detected.

During the operation for attaching the interchangeable lens 200 to the intermediate adapter 300 which is attached to the camera body 100, the switch 306 and the pin 307 take the condition as shown in FIG. 8B so that the switch 306 is turned off. For this reason, BVCC 151 is connected to BDET 154 through a resistor 151, "H" of BDET 154 is detected. In this manner, during the operation for attaching the interchangeable lens 200 to the intermediate adapter 300, the switch 306 is forcedly turned off. With this arrangement, even when LDET terminal of the intermediate adapter 300 is made in contact with any of the various terminals of the interchangeable lens 200 during the attaching operation, it is possible to prevent BDET 154 from being erroneously "L", consequently causing the BDET signal to be kept "H". Thus, it becomes possible to prevent an erroneous detection of the BDET signal by the body microcomputer 104.

Upon completion of attaching the interchangeable lens 200 to the intermediate adapter 300, the switch 306 and the pin 307 take the condition shown in FIG. 8B so that the switch 306 is turned on. This causes BDET 170 to be connected to a ground potential in the interchangeable lens so that "L" of BDET 170 is detected.

As described above, when the ADET detection signal and BDET detection signal are respectively set in "H" and "L", it can be detected that the operation for attaching the interchangeable lens 200 to the intermediate adapter 300 is completed. With the above-mentioned method, it is possible to prevent an erroneous detection of the completion of attaching the interchangeable lens 200 which is caused by a change in connecting status between terminals during the operation for attaching the interchangeable lens 200.

Table 3 shows detection states of ADET 170 and BDET 154 by the body microcomputer 104 in association with the attachment condition of an interchangeable lens 250 when the interchangeable lens 250 is attached to the camera body 100 without the intermediate adapter 300.

TABLE 3

| | ADET | BDET | condition of switch 106 |
|---|---|---|---|
| interchangeable lens not-attached | H | H | FIG. 8A |
| during an operation for attaching interchangeable lens | L | — | FIG. 8B |
| interchangeable lens attached | H | L | FIG. 8C |

When the interchangeable lens 200 is attached without the intermediate adapter 300, the pin 107 takes the condition as shown in FIG. 8B during the attaching. Then, the ADET detection signal is brought into "L". Thus, the body microcomputer 104 can recognize that the interchangeable lens has not been attached independent of the BDET detection signal. That is, the combination of "H" and "L" as the detection status of ADET 170 and BDET 154 is provided only when attaching of the interchangeable lens 250 is completed. Therefore, regardless of the use or non-use of the intermediate adapter 300, it is possible to surely detect attachment/non-attachment of the interchangeable lens by detecting the combination of "H" and "L" as the detection status of ADET 170 and BDET 154. By starting a power supply after the detection of the attachment status of the interchangeable lens, the body microcomputer 104 makes it possible to prevent damages to the elements in the interchangeable lens.

INDUSTRIAL APPLICABILITY

In accordance with the embodiments, since, upon attaching an interchangeable lens through an adapter, the attachment status of the interchangeable lens can be positively detected, it is possible to apply the system of the present embodiments to an intermediate adapter and a camera body of an imaging system of an interchangeable lens system.

Although the aforementioned description has been provided in connection with specified embodiments thereof, many other modifications, corrections and applications are apparent to those skilled in the art. Therefore, the embodiments are not limited by the disclosure provided herein. The present disclosure relates to subject matter contained in Japanese Patent Application No. 2008-116831, filed on Apr. 28, 2008, which is expressly incorporated herein by reference in its entirety.

What is claimed is:

1. An intermediate adapter to be interposed between a camera body and an interchangeable lens, the intermediate adapter comprising:
   a first terminal operable to be electrically connected to a lens detecting terminal provided on the camera body when the intermediate adapter is attached to the camera body;
   a second terminal operable to be electrically connected to a terminal provided on the interchangeable lens for providing a ground potential when the interchangeable lens is attached to the intermediate adapter; and
   a first switch interposed between the first terminal and the second terminal, the first switch operable to electrically connect the first terminal and the second terminal when the first switch is on, and disconnect the electrical connection between the first terminal and the second terminal when the first switch is off,
   wherein while the intermediate adapter is being attached to the interchangeable lens, the first switch is off to disconnect the electrical connection between the first terminal and the second terminal.

2. The intermediate adapter according to claim 1, wherein when the interchangeable lens is completely attached to the intermediate adapter, the first switch is turned on to electrically connect the first terminal and the second terminal.

3. The intermediate adapter according to claim 1, wherein attachment of the intermediate adapter to the camera body is detected by a switch provided in the camera body.

4. The intermediate adapter according to claim 1, wherein when the intermediate adapter is completely attached to the interchangeable lens, the lens detecting terminal provided on the camera body is controlled to be at a ground potential.

5. The intermediate adapter according to claim 1, further comprising:
   a third terminal operable to be electrically connected to an adapter detecting terminal provided on the camera body when the intermediate adapter is attached to the camera body; and
   a second switch operable to electrically connect the third terminal to a predetermined potential when the second switch is on, and disconnect the electrical connection of the third terminal and the predetermined potential when the second switch is off,
   wherein the second switch changes between the on and off operations based on a contact condition between the intermediate adapter and the camera body.

6. The intermediate adapter according to claim 5, wherein when the intermediate adapter is completely attached to the camera body, the second switch is turned on, and when the intermediate adapter is not completely attached to the camera body, the second switch is turned off.

7. An imaging system comprising a camera body, an intermediate adapter, and an interchangeable lens that is attached to the camera body through the intermediate adapter,
   the intermediate adapter comprising:
      a first ground terminal;
      a second ground terminal electrically connected to the first ground terminal;
      a first lens detecting terminal; and
      a second lens detecting terminal operable to be electrically connected to the first lens detecting terminal through a switch provided in the intermediate adapter, and
   the camera body comprising:
      a switch for detecting attachment of the intermediate adapter to the camera body;
      a grounding terminal; and
      a lens detecting terminal, attachment of the interchangeable lens being determined based on a potential of the lens detecting terminal of the camera body,
   the interchangeable lens comprising:
      a grounding terminal electrically connected to a ground potential; and
      a lens detecting terminal electrically connected to a ground potential,
   wherein,
   when the intermediate adapter is attached to the camera body, the grounding terminal of the camera body is electrically connected to the first grounding terminal of the intermediate adapter and the lens detecting terminal of the camera body is electrically connected to the first lens detecting terminal of the intermediate adapter,
   when the interchangeable lens is attached to the intermediate adapter, the second ground terminal of the intermediate adapter is electrically connected to the grounding terminal of the interchangeable lens and the second lens detecting terminal of the intermediate adapter is electrically connected to the lens detecting terminal of the interchangeable lens, and while the intermediate adapter is being attached to the interchangeable lens, the switch provided in the intermediate adapter disconnects an electrical connection between the first lens detecting terminal and the second lens detecting terminal of the intermediate adapter.

8. The imaging system according to claim 7, wherein while the intermediate adapter is being attached to the camera body, the switch provided in the camera body detects that the intermediate adapter is not attached to the camera body, and when the intermediate adapter is attached to the camera body, the switch provided in the camera body detects that the intermediate adapter is attached to the camera body.

9. The imaging system according to claim 8, wherein the switch provided in the camera body is operable to detect whether or not the intermediate adapter is attached to the camera body by being turned on and off by a pin, the pin being operable to move by contact with a portion of a main body of the intermediate adapter such that the switch is turned on by the pin when the intermediate adapter is completely attached to the camera body and the switch is turned off by the pin when the intermediate adapter is not completely attached to the camera body.

* * * * *